(12) United States Patent
Daher et al.

(10) Patent No.: US 10,062,264 B2
(45) Date of Patent: Aug. 28, 2018

(54) SYSTEM, APPARATUS AND METHOD TO FACILITATE ALARM SYSTEM COMMUNICATION

(71) Applicant: Carrier Corporation, Farmington, CT (US)

(72) Inventors: Gabriel Daher, Long Point (AU); Daniel Ming On Wu, Chatswood (AU); Ron Johan, Queens Park (AU)

(73) Assignee: CARRIER CORPORATION, Farmington, CT (US)

( * ) Notice: Subject to any disclaimer, the term of this patent is extended or adjusted under 35 U.S.C. 154(b) by 0 days.

(21) Appl. No.: 15/268,143

(22) Filed: Sep. 16, 2016

(65) Prior Publication Data
US 2017/0084162 A1 Mar. 23, 2017

Related U.S. Application Data

(60) Provisional application No. 62/220,581, filed on Sep. 18, 2015.

(51) Int. Cl.
*G08B 23/00* (2006.01)
*G08B 25/00* (2006.01)
(Continued)

(52) U.S. Cl.
CPC .......... *G08B 25/007* (2013.01); *G08B 25/08* (2013.01); *G08B 25/10* (2013.01); *H04L 12/4625* (2013.01); *H04L 12/66* (2013.01)

(58) Field of Classification Search
None
See application file for complete search history.

(56) References Cited

U.S. PATENT DOCUMENTS 5,134,644 A * 7/1992 Garton ................. G08B 25/08
340/539.1
5,956,487 A 9/1999 Venkatraman et al.
(Continued)

FOREIGN PATENT DOCUMENTS

CN 201444343 U 4/2010
CN 103578240 A 2/2014
(Continued)

OTHER PUBLICATIONS

European Search Report for application EP 16189064.5, dated Jan. 26, 2017, 13 pgs.
(Continued)

*Primary Examiner* — Phung Nguyen
(74) *Attorney, Agent, or Firm* — Cantor Colburn LLP (57) ABSTRACT

A customer terminal (1.000) is adapted to communicate with an alarm system (1.002), and includes: a customer terminal processor (4.019); customer terminal memory associated with the customer terminal processor (4.056); one or more external communication network interfaces (4.015, 4.214, 4.018.2); at least a first local communication interface adapted to connect with an alarm system (4.026, 4.062); wherein the customer terminal memory includes a web server (4.018) adapted to communicate with a remote device (2.030) via at least one external communication network (2.022, 2.024); the customer terminal being adapted to convert instructions in a first format from the remote device to an alarm system format suitable for reception by the alarm system via at least the first local communication interface.

11 Claims, 8 Drawing Sheets

(51) Int. Cl.
*G08B 25/08* (2006.01)
*G08B 25/10* (2006.01)
*H04L 12/46* (2006.01)
*H04L 12/66* (2006.01)

(56) References Cited

U.S. PATENT DOCUMENTS

| | | | |
|---|---|---|---|
| 6,640,140 B1 | 10/2003 | Lindner et al. | |
| 6,870,906 B2 | 3/2005 | Dawson | |
| 6,917,288 B2 | 7/2005 | Kimmel et al. | |
| 7,015,806 B2* | 3/2006 | Naidoo | G08B 13/19656 |
| | | | 340/506 |
| 7,113,090 B1 | 9/2006 | Saylor et al. | |
| 7,253,728 B2* | 8/2007 | Johan | G08B 13/19656 |
| | | | 340/505 |
| 7,440,809 B2 | 10/2008 | Lehman et al. | |
| 7,460,020 B2 | 12/2008 | Reyes et al. | |
| 7,467,400 B1 | 12/2008 | Moss et al. | |
| 7,551,071 B2 | 6/2009 | Bennett, III et al. | |
| 7,558,379 B2 | 7/2009 | Winick | |
| 7,576,646 B2 | 8/2009 | Hayden et al. | |
| 7,633,385 B2 | 12/2009 | Cohn et al. | |
| 7,761,571 B2 | 7/2010 | Bushmitch et al. | |
| 7,855,635 B2 | 12/2010 | Cohn et al. | |
| 8,289,134 B2* | 10/2012 | Caler | G08B 25/012 |
| | | | 340/4.1 |
| 8,331,544 B2 | 12/2012 | Kraus et al. | |
| 8,335,596 B2 | 12/2012 | Raman et al. | |
| 8,478,450 B2 | 7/2013 | Lu et al. | |
| 8,489,065 B2 | 7/2013 | Green et al. | |
| 8,508,355 B2 | 8/2013 | Pineau et al. | |
| 8,519,842 B2 | 8/2013 | R | |
| 8,526,311 B2 | 9/2013 | Ballard et al. | |
| 8,542,115 B2 | 9/2013 | Karim et al. | |
| 8,576,068 B2* | 11/2013 | Martin | G08B 25/016 |
| | | | 340/539.16 |
| 8,626,210 B2 | 1/2014 | Hicks, III | |
| 8,699,501 B2 | 4/2014 | Shin et al. | |
| 8,705,716 B2 | 4/2014 | Gregory | |
| 8,813,142 B2 | 8/2014 | Casey et al. | |
| 8,963,713 B2 | 2/2015 | Dawes et al. | |
| 9,117,349 B2 | 8/2015 | Shapiro et al. | |
| 9,191,228 B2* | 11/2015 | Fulker | G06F 17/30873 |
| 9,467,449 B2* | 10/2016 | Defrance | H04L 12/2836 |
| 2004/0205824 A1 | 10/2004 | Tsai | |
| 2005/0143863 A1 | 6/2005 | Ruane et al. | |
| 2006/0022816 A1 | 2/2006 | Yukawa | |
| 2006/0209857 A1* | 9/2006 | Hicks, III | G08B 25/08 |
| | | | 370/401 |
| 2006/0271695 A1* | 11/2006 | Lavian | G06F 21/552 |
| | | | 709/229 |
| 2007/0142076 A1 | 6/2007 | Sjostedt | |
| 2008/0025487 A1 | 1/2008 | Johan et al. | |
| 2008/0133679 A1* | 6/2008 | Addy | G06Q 10/06 |
| | | | 709/206 |
| 2008/0209034 A1* | 8/2008 | Shin | H04L 12/2807 |
| | | | 709/224 |
| 2009/0231120 A1 | 9/2009 | Chung | |
| 2010/0039512 A1 | 2/2010 | Kurz | |
| 2011/0106279 A1* | 5/2011 | Cho | G08C 17/02 |
| | | | 700/90 |
| 2012/0286951 A1 | 11/2012 | Hess et al. | |
| 2013/0082836 A1 | 4/2013 | Watts | |
| 2013/0191660 A1 | 7/2013 | Pham et al. | |
| 2013/0261803 A1 | 10/2013 | Kolavennu et al. | |
| 2013/0261821 A1* | 10/2013 | Lu | H04L 12/2807 |
| | | | 700/289 |
| 2013/0346630 A1 | 12/2013 | Oh et al. | |
| 2014/0266699 A1 | 9/2014 | Poder et al. | |
| 2014/0333772 A1 | 11/2014 | Periyasamy et al. | |
| 2014/0368331 A1 | 12/2014 | Cohn et al. | |
| 2015/0097949 A1 | 4/2015 | Ure et al. | |
| 2015/0161875 A1 | 6/2015 | Cohn et al. | |
| 2016/0019763 A1* | 1/2016 | Raji | G06F 1/263 |
| | | | 340/506 |
| 2016/0065414 A1* | 3/2016 | Sundermeyer | G06F 3/04883 |
| | | | 370/254 |

FOREIGN PATENT DOCUMENTS

| | | |
|---|---|---|
| CN | 103632471 A | 3/2014 |
| CN | 103632480 A | 3/2014 |
| CN | 104618682 A | 5/2015 |
| EP | 1982245 A1 | 10/2008 |
| EP | 2698774 A1 | 2/2014 |
| GB | 2448196 A | 10/2008 |
| GB | 2502075 A | 11/2013 |
| WO | 2009111996 A1 | 9/2009 |
| WO | 2011143273 A1 | 11/2011 |
| WO | 2013008252 A2 | 1/2013 |
| WO | 2014072910 A1 | 5/2014 |
| WO | 2015013756 A1 | 2/2015 |

OTHER PUBLICATIONS

Filibeli, M. Can et al., "Embedded web server-based home appliance networks", Journal of Network and Computer Applications, 30 (2007), p. 499-514.

Honeywell, "Honeywell: Tuxedo Touch Home Controller" accessed Sep. 19, 2016 at http://homesecurity.honeywell.com/tuxedo_touch_html, 2 pages.

Honeywell, "NetAXS Hybrid Access Control Panel", Honeywell Security and Data Collection, accessed Sep. 21, 2016 at https://www.google.com/url?sa=t&rct=j&q=&esrc=s&source=web&cd=1&ved=0ahUKEwjFpqrJgKHPAhVBdT4KHVNqBg0QFghGMAA&url=https%3A%2F%2Fhoneywell.com%2Fsites%2Fsecuritysouthasia%2FSiteCollectionDocuments%2F2.1-NetAXS.pdf&usg=AFQjCNHMPSyIYDTXoYujk4RTya-R0Kp1cw&bvm=bv.133387755,d cWw, 9 pages.

Yan, Liao Yun et al., "Design and Implementation of a Mobile Phone Integrated Alarming-System", 2009 International Conference on Multimedia Information Networking and Security, p. 65-68.

* cited by examiner

SYSTEM, APPARATUS AND METHOD TO FACILITATE ALARM SYSTEM COMMUNICATION

CROSS-REFERENCE TO RELATED APPLICATIONS

This application claims the benefit of U.S. provisional patent application Ser. No. 62/220,581, filed Sep. 18, 2015, the entire contents of which are incorporated herein by reference.

TECHNICAL FIELD

This disclosure relates to a system, apparatus and method of communicating with and controlling an alarm system.

BACKGROUND

Generally alarm systems are designed to communicate with a monitoring station to report alarms and other conditions at the monitored premises via the public switched telephone network (PSTN). Many alarm systems can also be configured to directly contact the end user on the occurrence of various predefined conditions. If so configured, when any of these conditions occur, the alarm system notifies the end user by placing a telephone call to the end user's cellular telephone and playing a sequence of tones or playing a voice recording. Other notification techniques include sending an SMS and/or email. In addition the end user can remotely control their alarm system by calling it via the PSTN and using DTMF (touch-) tones to arm and disarm their system.

Using the PSTN for communications with, and the remote control of, an alarm system can be problematic for a range of reason, such as the fact that that numerous Telcos are sun-setting their PSTNs, many end users are cancelling the PSTN service in favour of VoIP or cellular telephones, and the PSTN interface severely limits the capabilities of a modern alarm system.

Embodiments are intended to mitigate one or more of these limitations. One embodiment enables alarm systems designed to communicate over the PSTN to enjoy the benefits of modern cellular networks as well as wired and wireless broadband networks.

U.S. Pat. No. 7,253,728 (UHS Systems Pty Ltd), the entire disclosure of which is incorporated herein by reference, discloses a customer terminal adapted to convert alarm system signals to a format suitable for transmission via data packets.

SUMMARY

According to an embodiment, there is provided a customer terminal (1.000) adapted to communicate with an alarm system (1.007); the customer terminal including: a customer terminal processor (4.019); customer terminal memory (4.056) associated with the customer terminal processor; one or more external communication network interfaces (4.015, 4.215, 4.214, 4.018.2); at least a first local communication interface (4.026) adapted to connect with an alarm system; wherein the customer terminal memory includes a web server (4.018) adapted to communicate with a remote device (1.030) via at least one external communication network; the customer terminal being adapted to convert instructions in a first format from the remote device to an alarm system format suitable for reception by the alarm system via at least the first local communication interface with the alarm system.

The web server can be adapted to convert the instructions in the first format to an intermediate format and to send the instructions in the intermediate to the local communication interface, and the local communication interface can be adapted to convert the instructions in the intermediate format to the alarm system format for transmission to the alarm system.

The web server can be adapted to receive information from the alarm system.

The web server can be adapted to store information from the alarm system.

The web server is adapted to send information to the remote device in response to a request from the remote device.

The web server can be adapted to transmit designated information to the remote device.

The customer terminal can include a second communication interface adapted to connect with the alarm system via which the alarm system can be adapted to send information to the customer terminal.

According to another embodiment, there is provided an alarm transmission system including a customer terminal, and a remote device adapted to communicate with the web server via at least one of the external communication networks.

According to a further embodiment, there is provided a method of sending instructions from a remote device to an alarm system via an alarm transmission system, the method including: logging the remote device on to the web server;
  sending instructions in a first format from the remote device to the web server;
  converting the instructions in the first format to an alarm system format;
  sending the instructions in the alarm system format to the alarm system.

The method can further include: converting the instructions in the first format to an intermediate format; and converting the instructions in the intermediate format to the alarm system format before sending the instructions in the alarm system format.

A further embodiment provides a method of storing alarm system information in a customer terminal including: receiving information in the alarm system format from the alarm system; and converting the information in the alarm system format from the alarm system to the first format; and storing the information in the first format in the web server.

The method of storing alarm system information can further include: converting the instructions in the alarm system format to an intermediate format; and converting the instructions in the intermediate format to the first format before storing the instructions in the first format.

The first alarm system interface can be a keypad bus (KPB) interface.

The customer terminal may include a second alarm system interface adapted to be connected to an alarm communication path of the alarm system (1.003).

The CT can include a first communicator (1.014) adapted to communicate with the alarm system via a second alarm system interface (1.003).

The alarm system can be integrated with the customer terminal.

The web server can be adapted to send first messages to the alarm system via the first alarm system interface (1.005).

The web server can be adapted to receive second messages from the alarm system via the first alarm system interface (1.005).

The web server can be adapted to receive third messages via one or more of the network interfaces (1.017.4 and 1.034).

The web server can be adapted to send fourth messages via one or more of the network interfaces (1.017.4 and 1.034).

The customer terminal can be adapted to distinguish two or more of different types of signals received via the first alarm system interface.

The different types of signals can include one or more of acknowledgement signals, alarm signals, and status signals.

In a second embodiment, the customer terminal can include a second communicator (1.014) connected with an alarm sender (1.006) of the alarm system.

The web server can be connected to the communicator via at least one CT internal communication path (1.017.1).

The CT communication path can include a local communication network.

The CT communication path can include an internal local area network (LAN) (1.017.1).

The communicator (1.014) can be adapted to convert signals on the alarm communication path to at least one format suitable for transmission via at least one external communication network (1.022, 1.024).

The communicator (1.014) can be adapted to enable bi-directional communication between the alarm system and at least one external communication network (1.022, 1.024).

The communicator (1.014) can be adapted to communicate alarm status information to the web server (1.018).

The web server (1.018) can be connected to the alarm system via a communication path (1.005).

The first communication path can be a keypad bus (KPB) (1.005).

The web server (1.018) can be adapted to enable control of the alarm system via at least one external communication network (1.022, 1.024).

The web server can be adapted to enable control signals to be sent via at least one external communication network to the alarm system via the KPB.

The web server can be adapted to receive and store information from the KPB.

The web server can be adapted to transmit stored information via said at least one external communication network.

The web server can be adapted to convert information received from the alarm system into a first format.

The web server can be adapted to transmit stored information via said at least one external communication network in response to a request received via one of the said at least one external communication networks.

A remote communication device (1.030) can communicate with the web server via said at least one external communication network.

The remote communication device can be used to control at least one function of the alarm system via the web server.

A function of the customer terminal is to mediate communications between the alarm system and one or more external communication systems.

According to another embodiment there is provided an alarm transmission system including a customer terminal, and a remote device adapted to communicate with the web server via at least one of the external communication networks.

According to a further embodiment, there is provided a method of sending instructions from a remote device to an alarm system via a customer terminal, the method including: logging the remote device on to the web server; sending instructions from the remote device to the web server in a first format; converting the instructions to the second format; sending the instructions to the alarm system.

The method can further include: receiving information from the alarm system; and converting information in the second format from the alarm system to the first format; and storing the information in the web server.

BRIEF DESCRIPTION OF THE DRAWINGS

An embodiment or embodiments will now be described, by way of example only, with reference to the accompanying drawings, in which.

The numbering convention used in the drawings is that the digits in front of the full stop indicate the drawing number, and the digits after the full stop are the element reference numbers. Subordinate elements may be indicated by the use of a further full stop. Where practical, the same element reference number is used in different drawings to indicate corresponding elements.

The drawings are intended to illustrate features of the embodiments and are not necessarily to scale. The orientation of the drawings is chosen to illustrate features and is not necessarily indicative of the orientation of the device in use.

It will be understood that wireless and wireline communication paths are generally interchangeable.

DETAILED DESCRIPTION OF THE EMBODIMENT

Figure 1:
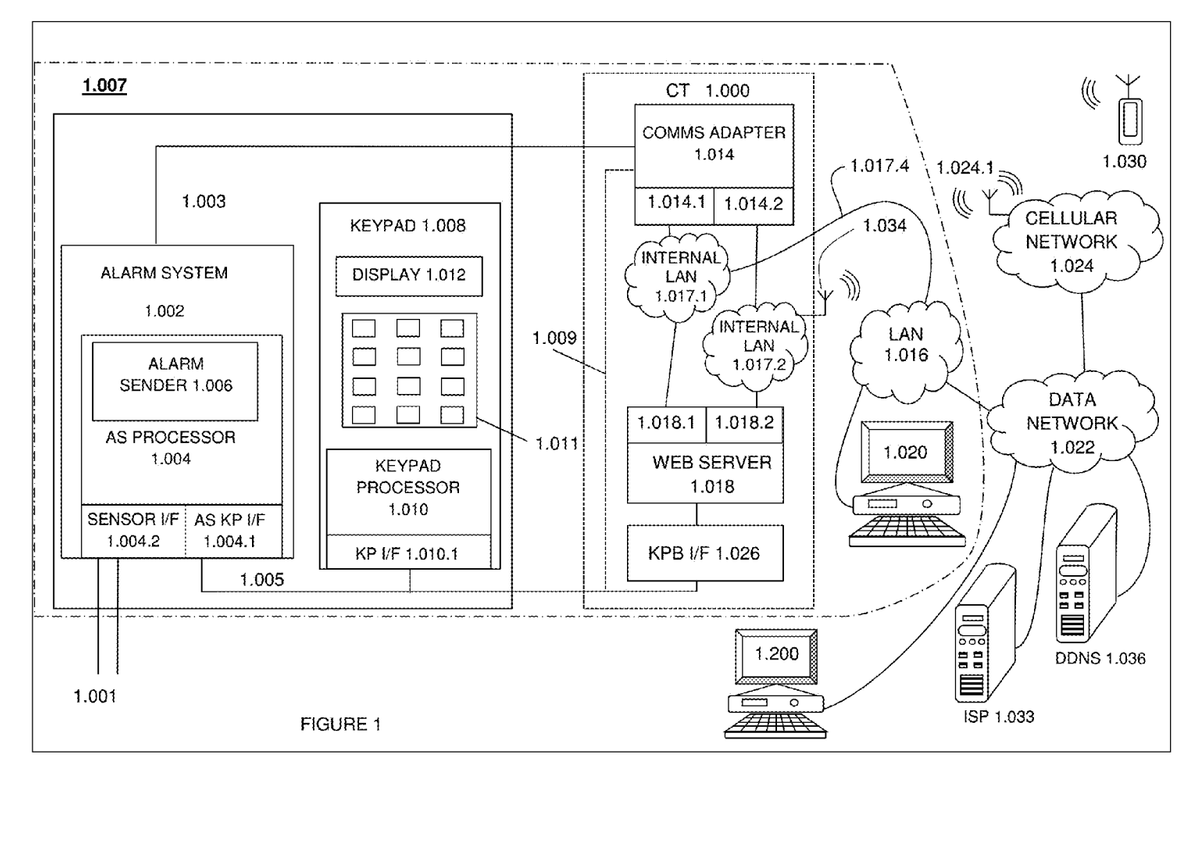
FIG. 1 shows a system incorporating a customer terminal according to a first embodiment.

FIG. 1 shows alarm and broadband equipment at a typical customer premises (1.007) including a communication arrangement according to an embodiment. An alarm system 1.002 and associated keypad 1.008 can be connected to one or more external communication networks 1.022, 1.024 via customer terminal 1.000.

The alarm system 1.002 includes an alarm processor 1.004 having one or more alarm detector inputs 1.001, alarm interface 1.004.2, an alarm processor 1.004 and associated keypad interface 1.004.1 and an alarm sender or digital dialer (DD) 1.006. Keypad (1.008) provides a local user interface for the alarm system (1.002) panel and is connected to the alarm processor via keypad bus 1.005 and associated keypad bus interface 1.004.1.

The alarm processor keypad interface 1.004.1 formats communication to and from the alarm processor 1.004 and the keypad bus 1.005. The alarm interface (1.004.2) formats communications between the alarm processor 1.004 and alarm sensors connected to alarm inputs 1.001.

The keypad includes a keypad processor 1.010 with associated keypad interface 1.010.1, keys 1.011, and a display or visual indicator 1.012. The keypad interface 1.010.1 formats communication to and from the keypad processor 1.010 and the keypad bus 1.005.

In this embodiment, the customer terminal 1.000 includes a communicator 1.014 and a web server 1.018 connected to one or more internal communications links 1.017.1, 1.017.2 which facilitate communications with one or more external networks 1.022, 1.024.

The communicator includes a first communication adapter interface 1.014.1 connected to a first internal LAN 1.017.1, and second communications adapter interface 1.014.2 connected to a second internal LAN 1.017.2.

The web server 1.018 includes first web server interface 1.018.1 connected to first internal LAN 1.017.1 and second web server interface 1.018.2 connected to second internal LAN 1.017.2.

The first internal LAN can provide a communication path to an external wired network 1.022. The second internal LAN can interchangeably connect the web server and the communicator with a wireless transceiver such as a cellular transceiver 1.034 which facilitates wireless communication with an external wireless network such as cellular network 1.024.

The web server 1.018 includes a third web server interface 1.026 through which the web server is adapted to communicate with the alarm system 1.002 via keypad bus 1.005.

The customer premises may include a premises wired or wireless LAN 1.016 to which other devices such as computer 1.020 can be connected. The first internal LAN 1.017.1 can be connected to the premises LAN 1.016 using wireless (WiFi) or Ethernet 1.017.4. The premises LAN 1.016 can connect to an external wide area network such as data network 1.022. This provides one communications path for the customer terminal 1.000 to connect to external agencies such as an alarm monitoring centre or automation system 1.200 via the wide area network.

The internal LAN 1.017.2 can communicate via external wireless network 1.024, providing another communications path which can connect, for example, with wide area network 1.022.

Other items shown in FIG. 1 include a dynamic domain name server (DDNS) 1.036 and an internet service provider (ISP) 1.033.

The alarm system 1.002 is connected to the customer terminal 1.000 via first communication link 1.005 and second communication link 1.003. As discussed above, the customer terminal may include a communicator, such as a dial capture communicator 1.014, with associated communication interfaces 1.014.1, 1.014.2 via which the communicator can be connected to one or more external communication networks 1.022, 1.024.

The internal LAN 1.017.1 enables both the communication adapter 1.014 and the web server 1.018 to connect to LAN 1.016, the LAN 1.017.1 enabling communications to or from the web server 1.018 to be distinguished from communications to or from the communicator 1.014 while enabling both the communicator and the web server to be connected to LAN 1.016 via line 1.017.4.

The customer terminal 1.000 can also include a wireless transceiver, represented by antenna 1.034, via which the customer terminal can be connected to wireless communication network 1.024. The wireless transceiver 1.034 can be connected to a second internal communication link including internal LAN 1.017.2 allowing it to be accessed by both the web server (1.018) and the communicator (1.014).

The internal LAN 1.017.2 enables both the communication adapter 1.014 and the web server 1.018 to connect to wireless transceiver 1.034, the LAN 1.017.2 enabling communications to or from the web server to be distinguished from communications to or from the communications adapter 1.014 while allowing both the web server and the communications adapter to utilize the same transceiver 1.034.

The use of internal LANs 1.017.1 & 1.017.2 enables both the communications adapter 1.014 and the web server 1.018 to be connected to external networks with a reduced number of external connections.

When an alarm detector signal is received on one or more of the alarm detector inputs 1.001, the alarm system processor 1.004 causes the alarm sender 1.006 to transmit a corresponding alarm signal on second communication link 1.003. In the case of a legacy system, the alarm signals may be in a PSTN signalling format intended for transmission over a PSTN telephone line to a security company.

The communication link 1.003 connects the alarm signals to the communicator 1.014 of the customer terminal 1.000.

The alarm system processor 1.004 is connected via interface 1.004.1 to second communication link 1.005, which can be a serial bus such as a keypad bus. The keypad bus is connected to the keypad processor 1.010 of the keypad 1.008, enabling the alarm system 1.002 to receive key input instructions from the keypad 1.008. The keypad can include an array of input buttons 1.011 and a display 1.012 or a touchscreen input (not shown). The alarm system 1.002 can also be adapted to transmit information, such as alarm information to the communicator (1.014) via the keypad bus 1.005.

The communicator 1.014 is adapted to receive signals from the digital dialler (DD) 1.006 on line 1.003 or directly from the alarm processor 1.004 via the associated keypad interface 1.004.1 on line 1.005 and to convert the information to a format suitable for transmission using at least one external communications link. The communications adapter can be adapted to convert the signals from the DD 1.006 to one or more communications protocols compatible with one or more external communications networks.

The communicator 1.014 is adapted to communicate with one or more communications networks such as, for example, LAN 1.016, wireless network 1.024, or wide area network 1.022. The communication with the external wide area network can be via a LAN 1.016 as shown in FIG. 1. Alternatively, the internal LAN 1.017.1 can connect directly with the wide area network 1.022 via a cellular network as shown in FIG. 1.

A system adapted to convert the DD signals to appropriate protocols is described in U.S. Pat. No. 7,253,728 (UHS Systems Pty Ltd), the entire disclosure of which is incorporated herein by reference.

The alarm signals, converted to the appropriate network protocol or protocols can be transmitted via the network or networks to a security company server or management server as described in U.S. Pat. No. 7,253,728.

As shown in FIG. 1, web server 1.018 can be connected to the second communication link 1.005. Thus the web server can communicate with the alarm system processor 1.004 and the keypad processor 1.010 via the communication link 1.005. The web server includes one or more communication interfaces, 1.018.1, 1.08.2 connected to corresponding ports of internal LANs 1.017.1, 1.017.2 so that the web server can be adapted to communicate with one or more communication networks, such as LAN 1.016, wide area network 1.022 or wireless network 1.024.

The web server can be adapted to receive signals on the communication link 1.005 and convert them to the appropriate protocol(s) for onward transmission. The web server can be adapted to automatically forward at least some signals it receives from the second communication link 1.005 to one or more designated recipients such as local terminal 1.020, automation system 1.200 or remote terminal 1.030 connected to one of the communication networks such as 1.016, 1.022 and 1.024.

In addition, the web server can be adapted to receive signals from the communicator 1.014 via the LAN 1.017.1, thus enabling the web server to receive alarm signal information transmitted by alarm sender 1.006 on communication link 1.003. This information can be included in a web page on the web server for access from a remote terminal, such as 1.030 or a "local" communication device, such as computer 1.020.

As shown in FIG. 1, "local" communication device, computer 1.020 in the embodiment shown, can be connected to the LAN 1.016, which may be wireless to enable a user to interrogate the web server 1.018 as to the status of the alarm system, or to control the alarm system via the web server.

The remote terminal (1.030) gains access to the web server (1.018) via the internet using a public IP address or a URL. If the customer terminal (1.000) is connected to the broadband network via ISP 1.033 with a dynamic IP address then a dynamic DNS (DDNS), represented in FIG. 1 by server 1.036, is used to resolve the URL to the current IP address of the customer terminal 1.000.

As discussed below, the web server 1.018 can provide an information pull service enabling a remote authorized user to retrieve information from the web server via one of the communication networks 1.022, 1.024. Furthermore, the web server can be adapted to enable a remote authorized user to control the alarm system.

In a preferred embodiment, the alarm system 1.002 and the web server 1.018 can be located at the same premises. The alarm system 1.002, keypad 1.008 and the web server 1.018 can be incorporated in a single device.

Figure 2:
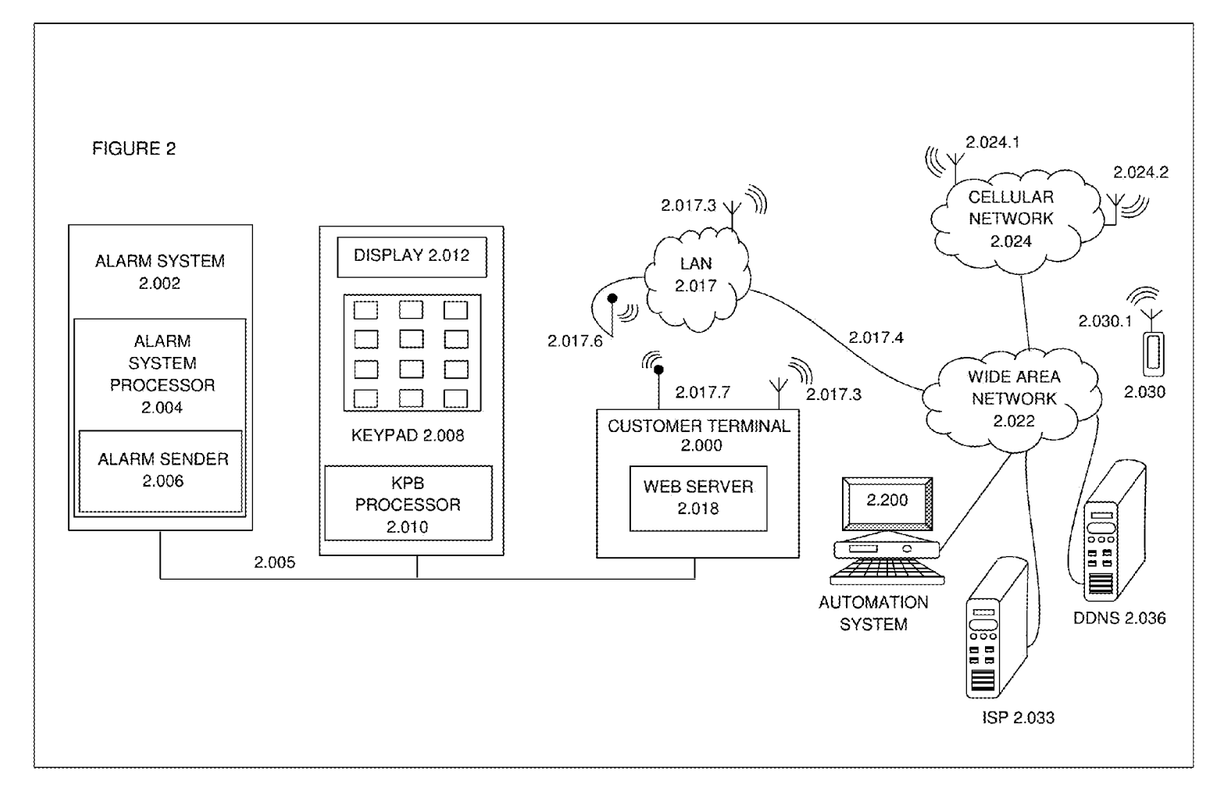
FIG. 2 shows a system incorporating a customer terminal according to a further embodiment.

FIG. 2 shows a further embodiment, in which the user can be located remotely from the keypad 2.008 and the LAN 2.017. In this embodiment, the user can use a communication device (mobile phone, tablet computer, etc., or a purpose built communication device) 2.030 to communicate with the web server 2.018 and, if required, with the alarm system 2.002. The remote communication device 2.030 can be used to interrogate the web server as to the status of the alarm system and to send commands to the alarm system via the web server.

In this embodiment, the alarm system 2.002 uses the alarm sender 2.006 to send the alarm message to the customer terminal 2.000 over the keypad bus 2.005 eliminating the need for a dial capture circuit.

FIG. 2 illustrates a remote terminal, such as mobile device 2.030 via which a user is enabled to remotely access the alarm system 2.002. The mobile device can be used to access the alarm system via wireless network 2.024 via either wireless link 2.024.1 or wide area network 2.022.

The remote terminal 2.030 incorporates a computer program such as a web browser or an app which interact with the web server 2.018. This enables the remote terminal to receive information from the web server and to be used to send instructions to the alarm system (2.002) via web server 2.018 and keypad bus 2.005.

Figure 3:
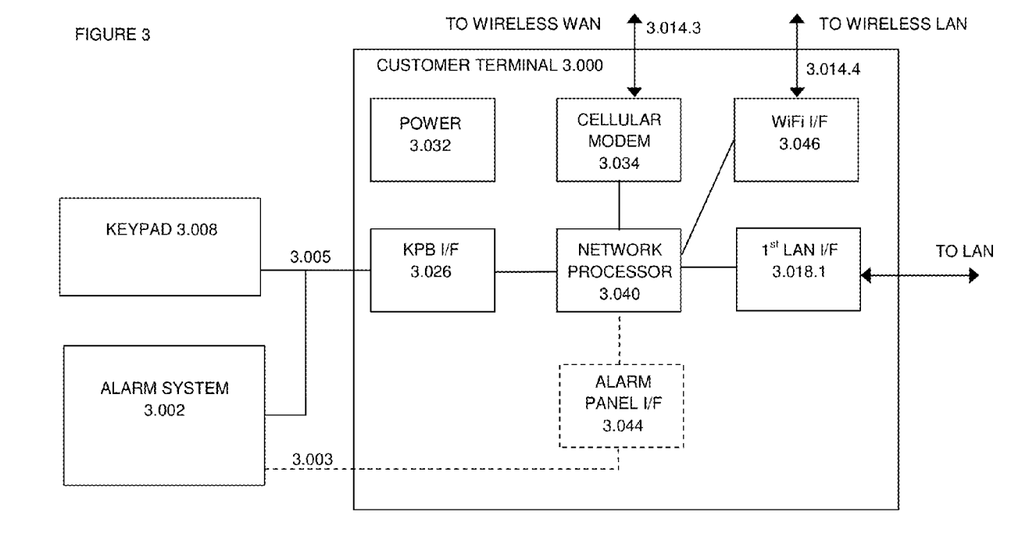
FIG. 3 illustrates functional elements of a customer terminal adapted for use in a system according to an embodiment.

FIG. 3 illustrates a functional block diagram of a customer terminal 3.000 according to an embodiment as well as associated alarm system 3.002 and keypad 3.008. The customer terminal 3.000 may be adapted to communicate via a cellular connection, LAN and wireless LAN, and may be equipped with one or more additional interfaces such as dial capture. Functional elements of the customer terminal include a power supply 3.032, network processor 3.040, a wireless modem such as cellular modem 3.034, WiFi interface 3.046, LAN interface 3.018.1, and keypad bus interface 3.026. An optional alarm panel interface 3.044 can also be used to connect the customer terminal to the alarm system 3.002 via optional communication link 3.003.

The LAN interface 3.018.1 can be adapted to communicate with an external network such as 1.016 via internal LAN 1.017.1 in FIG. 1. Cellular modem 3.034 can be adapted to communicate with cellular network (1.024). Keypad bus interface 3.026 can be adapted to communicate via the alarm system keypad bus 3.005. An optional alarm panel interface 3.044 can be provided in the case where the alarm system 3.002 sends alarm signals via alarm sender 1.006, as is generally the case with legacy alarm systems. Alarm panel interface 3.044 can be adapted to communicate with the alarm system alarm sender (1.006) via communication link 3.003.

Additional interfaces can be provided to communicate with other equipment, for example local terminal (such as 1.020 in FIG. 1) having a compatible communication link. WiFi modem 3.046 can be adapted to communicate with a wireless LAN.

Figure 4:
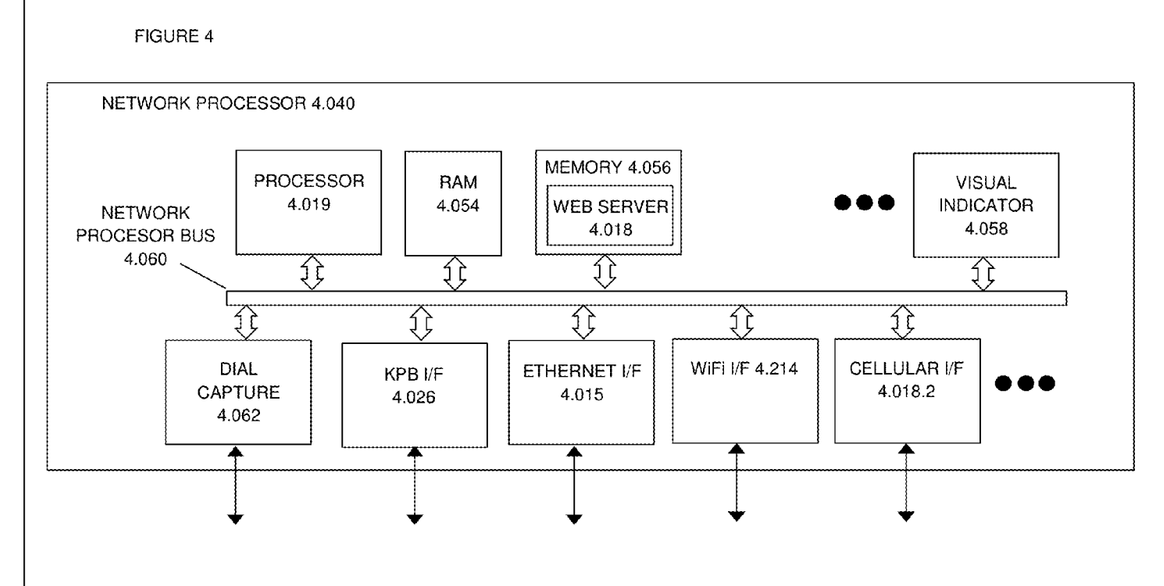
FIG. 4 illustrates functional elements of a network processor adapted for use in a system according to an embodiment.

FIG. 4 is a functional block diagram illustrating functional elements of an embodiment of a network processor including a web server adapted for use with the present disclosure.

The network processor 4.040 can include processor 4.019 and various functional elements such as, for example, dial capture 4.062, keypad bus interface 4.026, WiFi interface 4.214, cellular interface 4.018.2, Ethernet interface 4.015, memory 4.056 including web server software 4.018, visual indicator or display 4.058. While these elements of the web server are shown as connected by a single bus 4.060, alternative configurations are possible.

Figure 5:
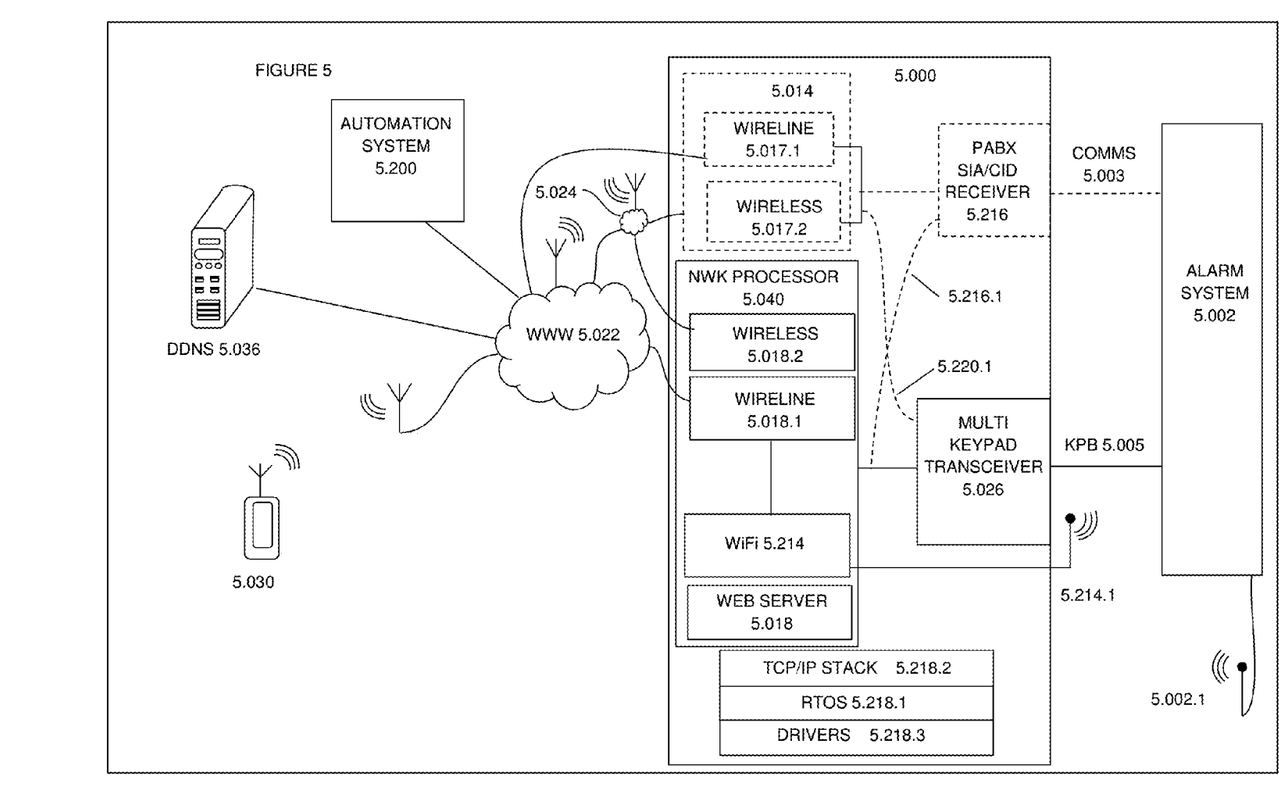
FIG. 5 illustrates firmware architecture of a system according to an embodiment.

FIG. 5 is a block diagram showing the firmware architecture of the customer terminal 5.000 according to an embodiment. FIG. 5 includes optional firmware elements shown in dashed outline to accommodate the case where the alarm system 5.002 transmits alarm signals on a separate line from the KPB.

In the case where the alarm system is adapted to transmit alarm signals over the KPB 5.005, keypad interface 5.026, which may be a configurable multi-keypad transceiver supporting multiple KPB electrical interfaces, is connected to alarm system 5.002 via KPB 5.005. KPB interface 5.026 converts signals from the alarm system 5.002 to a format suitable for use by the customer terminal and converts signals from the customer terminal to the alarm system to a format suitable for use by the alarm system. Alarm signals from the alarm system can thus be sent by either or both of the wireline interface 5.018.1 or wireless (cellular) interface 5.018.2. In addition, information transmitted by the alarm system 5.002 can also be stored in the web server. Conversely, either wireline interface 5.018.1 or wireless (cellular) interface 5.018.2 can send messages to alarm system 5.002 via the web server (5.018) and KPB interface 5.026. The network processor can use a protocol stack such as the TCP/IP stack 5.218.1, together with real time operating system 5.218.2 and suitable drivers 5.218.3 to enable communication with the external networks and devices.

Optionally, the customer terminal and the alarm system can also be adapted to communicate via a wireless link 5.214.1, 5.002.1. The wireless link can be, for example, a WiFi link.

To enable the customer terminal to receive instructions or queries from a remote terminal 5.030, or transmit messages to the remote terminal via an external network such as 5.022, the network processor 5.040 is equipped with both wireline (5.018.1) and wireless (5.018.2) interfaces. The remote terminal can include a web browser or an app which is adapted to communicate with the web server 5.018. Keypad transceiver 5.026 is connected to the alarm system keypad bus 5.005. The keypad transceiver is connected to network processor 5.040 which can include one or more network interfaces, such as external wireline interface 5.018.1 or external wireless (cellular) interface 5.018.2.

Interface 5.216 can convert signals between alarm system signalling, for example SIA (Security Industry Association) or ContactID signalling, to a network protocol. The network processor can be programmed to direct specified types of messages from the alarm system to one or more designated recipients via either of a wireline interface 5.018.1, or a wireless (cellular) interface 5.018.2 and external network 5.022.

In an alternative embodiment, in which the alarm system 5.002 transmits alarm signals over the keypad bus 5.005, the customer terminal can include a link between the keypad bus transceiver 5.026 and the alarm communication system (5.017.1 and 5.017.2) allowing the alarm message to be delivered to the automation system 5.200 via a wireline or wireless (cellular) network.

Figure 6:
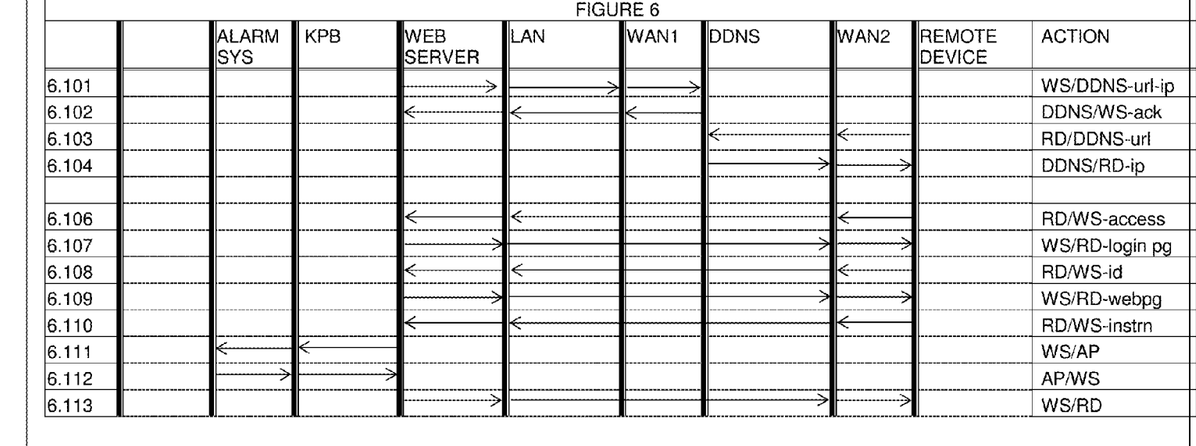
FIG. 6 is a flow diagram illustrating information flows according to an embodiment.

FIG. 6 is a flow chart showing the setting up of communication between a remote terminal such as 5.030 and an alarm system 5.002 via the web server 5.018. The remote terminal 5.030 is programmed with an app enabling it to communicate with the web server 5.018, and the web server is adapted to interpret messages from the remote terminal and communicate with the alarm system.

At 6.101, when the customer terminal is initiated the web server 2.018 registers its IP address with a Dynamic Domain Name Server (DDNS) such as 2.036 in FIG. 2. IP addresses can be allocated dynamically via an ISP 2.033. The DDNS establishes an association between the web server's IP address and the web server's URL and broadcasts the update to the internet DNS', and acknowledges the change to the web server at 6.102.

When a remote terminal 2.030 programmed with the app software for web server 2.018 is used to send instructions to an alarm system such as 2.002, the remote terminal first sends a DNS request seeking the IP address for the URL of the web server via a wide area network (WAN) (6.103). The DDNS can disseminate web server's IP address to relevant domain name servers within the WAN (6.104).

The DNS sends the web server IP address to the remote terminal (6.015).

The remote terminal then uses the web server's IP address to communicate with the web server via the WAN, LAN 2.017 (6.106).

The web server then returns a login page to the remote terminal via the LAN, and WAN (6.107).

The remote terminal returns the appropriate identification credentials to the web server via the WAN and LAN (6.108).

The web server authenticates the identification credentials and returns a web page enabling the remote terminal to send instructions intended for the alarm system via the LAN and WAN (6.109).

The remote terminal can then send instructions intended for the alarm system to the web server via the WAN and LAN (6.110).

The web server 2.018 includes software to convert the instructions received from the remote computer to a format suitable for the serial bus 2.005 of the alarm system 2.002. The web server then forwards the instructions to the alarm system (6.111).

The alarm system 2.002 can then acknowledge the instructions to the web server (6.112), and the web server can confirm the completion of the instruction to the remote terminal (6.113).

Signals from the alarm system, such as status signals or acknowledgement signals can be sent from the alarm system to the web page, which can convert them for transmission to the remote terminal via LAN and WAN.

Figure 7:
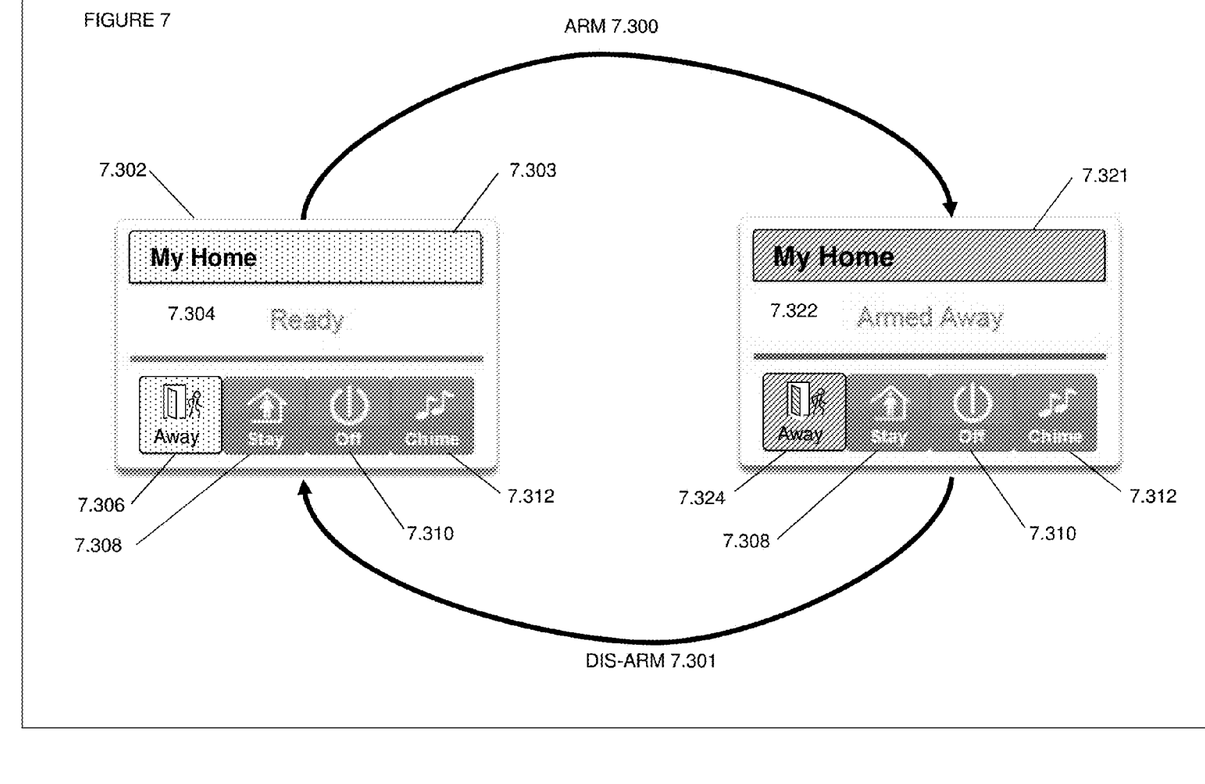
FIG. 7 illustrates an example of the screen displays of a remote device in accordance with an embodiment.

FIG. 7 shows "before" and "after" screen displays for a remote device using an app in accordance with a method to send instructions to an alarm system. The information to enable the screen display is delivered to the remote device from the web server when the remote device is logged on to the web server. The screen display which the remote device retrieves from the web server changes from a first state to a second state when an arming operation is carried out. Similarly, the screen display can toggle back from the second state to the first state when a DIS-ARM operation is carried out.

A first screen display 7.302 represents an initial screen of a remote device for the process of arming an alarm system, and a second screen 7.320 represents the screen display when the alarm system has been armed. The screen display can include a header or descriptor 7.303 such as "My Home" to indicate which system is being accessed. This enables more than one system to be remotely accessed via the remote device. For example, a second system (not shown) may use the header "Office". The system chosen would be selected during the login process.

In the embodiment shown in FIG. 7, after the remote device has logged on to the web server, a status display section 7.304 of the first screen display, such as the background of the header 7.303, can include a written description of the status of the alarm system, such as an indication that the system is "READY" to receive instructions. The screen also has a number of touch buttons such as 7.306 (Away), 7.308 (Stay), 7.310, (Off), and 7.312 (Chime).

The Away button is used to enable the user to arm the alarm system via the web server. When the user operates the Away button, the remote device sends an "ARM" instruction to the web server and the web server responds by sending an "ARM" command to the alarm system. When the alarm system has been armed, the alarm system can send an acknowledgement signal to the web server, and the web server can change the stored information for the screen display to indicate the new status of the alarm system.

One or more status indicators can be used. For example, the color of the Away button can be changed (7.324) to indicate the new state of the alarm system. The written display can change from "Ready" to "Armed Away" (7.322) indicating that the alarm system is armed and that the user is absent from the premises. To provide rapid visual indication of the status of the alarm system, a color flag such as the background color 7.321 can change, for example from green (DIS-ARMed state) to red (ARMed state).

Figure 8:
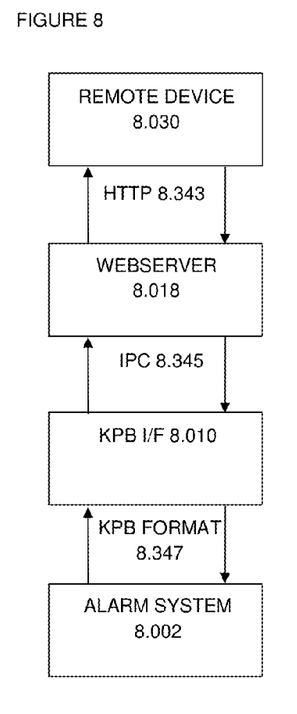
FIG. 8 illustrates the signalling formats of the elements of a system according to an embodiment.

FIG. 8 illustrates the function of the system in enabling a remote device 8.030 to send commands to the alarm system 8.002 via the web server 8.018.

Communication between the remote device 8.030 and the web server 8.018 can be carried out using an internet compatible format 8.343, such as HTTP. The web server can then convert instructions received from the remote device and intended for the alarm system to an intermediate format 8.345, such as IPC (inter-process communication) for forwarding to the keypad bus interface 8.010. The keypad bus interface then adapts the instructions to a format suitable for the alarm system 8.347. Each communication path can be bi-directional.

Figure 9:
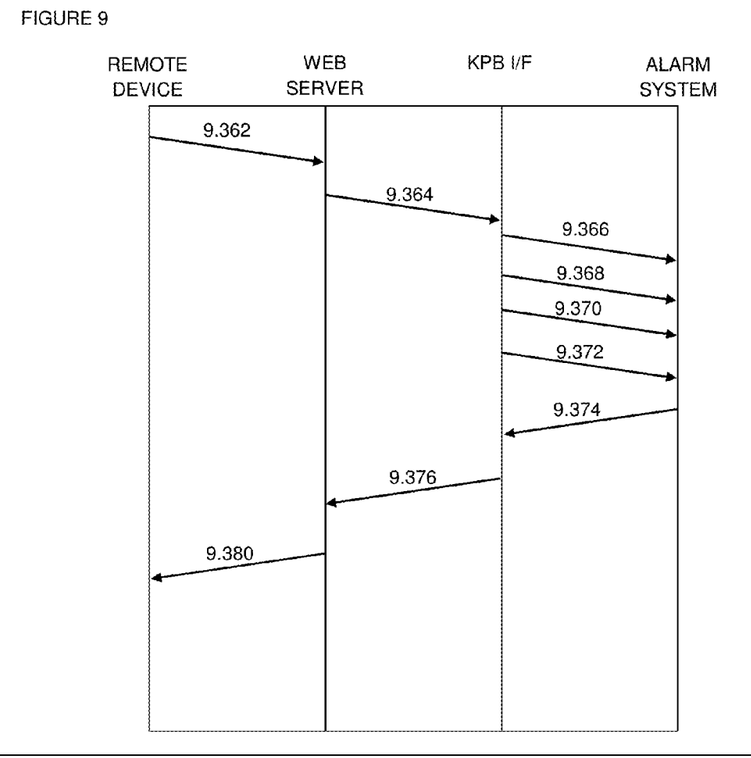
FIG. 9 illustrates signal flow during an "arm" operation in a system according to an embodiment.

FIG. 9 shows the interchange of instructions between a remote device and an alarm system via a web server for remotely arming the alarm system in accordance with an embodiment. At 9.362, the remote device sends an arm instruction to the web server in HTTP format. The web server first converts the instruction to IPC format and, at 9.364, sends the instruction to the keypad bus interface. The keypad bus interface then adapts the instruction to the keypad bus input format suitable for the alarm system and sends the instruction to the alarm system in the keypad bus format. As shown in FIG. 9, the keypad bus format may involve a series of pulses 9.366, 9.368, 9.370, 9.372. The alarm system can then send an acknowledgement signal to the keypad bus interface at 9.374. The keypad bus interface can convert the acknowledgement signal to IPC format and transmit it to the web server at 9.376. The web server can then update the stored screen display which the remote terminal receives at 9.380.

Reference to a wired network includes optical fibre networks.

In this specification, reference to a document, disclosure, or other publication or use is not an admission that the document, disclosure, publication or use forms part of the common general knowledge of the skilled worker in the field of this disclosure at the priority date of this specification, unless otherwise stated.

In this specification, terms indicating orientation or direction, such as "up", "down", "vertical", "horizontal", "left", "right" "upright", "transverse" etc. are not intended to be absolute terms unless the context requires or indicates otherwise.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It will be understood that the embodiments disclosed and defined herein extends to all alternative combinations of two or more of the individual features mentioned or evident from the text. All of these different combinations constitute various alternative aspects of the disclosure.

While particular embodiments have been described, it will be evident to those skilled in the art that the present disclosure may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:

1. A customer terminal adapted to communicate with an alarm system;
   the customer terminal comprising:
   a customer terminal processor;
   customer terminal memory associated with the customer terminal processor;
   one or more external communication network interfaces;
   at least a first local communication interface adapted to connect with the alarm system;
   wherein the customer terminal memory comprises a web server adapted to communicate with a remote device via at least one external communication network;
   the customer terminal being adapted to convert instructions in a first format from the remote device to an alarm system format suitable for reception by the alarm system via at least the first local communication interface with the alarm system;
   wherein the web server is adapted to convert the instructions in the first format to an intermediate format and to send the instructions in the intermediate format to the first local communication interface (LCI), and the first LCI is adapted to convert the instructions in the intermediate format to the alarm system format for transmission to the alarm system.

2. The customer terminal as claimed in claim 1, wherein the web server is adapted to receive information from the alarm system.

3. The customer terminal as claimed in claim 2, wherein the web server is adapted to store information from the alarm system.

4. The customer terminal as claimed in claim 2, wherein the web server is adapted to send information to the remote device in response to a request from the remote device.

5. The customer terminal as claimed in claim 2, wherein the web server is adapted to transmit designated information to the remote device.

6. The customer terminal as claimed in claim 1, further comprising a second communication interface with the alarm system via which the alarm system is adapted to send information to the customer terminal.

7. An alarm transmission system comprising the customer terminal as claimed in claim 1, and the remote device adapted to communicate with the web server via at least one of the external communication networks.

8. A method of sending instructions from the remote device to the alarm system via the alarm transmission system as claimed in claim 7, the method comprising:
   logging the remote device on to the web server;
   sending instructions in the first format from the remote device to the web server;
   converting the instructions in the first format to the alarm system format;
   sending the instructions in the alarm system format to the alarm system.

9. The method of sending instructions as claimed in claim 8, further comprising:
   converting the instructions in the first format to the intermediate format; and
   converting the instructions in the intermediate format to the alarm system format before sending the instructions in the alarm system format.

10. A method of storing alarm system information in the customer terminal as claimed in claim 1, the method comprising:
    receiving information in the alarm system format from the alarm system; and converting the information in the alarm system format from the alarm system to the first format; and storing the information in the first format in the web server.

11. The method of storing alarm system information as claimed in claim 10, further comprising:

converting the instructions in the alarm system format to the intermediate format; and converting the instructions in the intermediate format to the first format before storing the instructions in the first format.

* * * * *